United States Patent [19]
Stokes

[11] Patent Number: 4,801,834
[45] Date of Patent: Jan. 31, 1989

[54] ROTOR ASSEMBLY
[75] Inventor: Vijay K. Stokes, Schenectady, N.Y.
[73] Assignee: General Electric Company, Schenectady, N.Y.
[21] Appl. No.: 137,386
[22] Filed: Dec. 23, 1987

Related U.S. Application Data
[63] Continuation of Ser. No. 857,280, Apr. 30, 1986, abandoned.
[51] Int. Cl.⁴ .............................................. H02K 1/22
[52] U.S. Cl. ..................................... 310/261; 310/42; 310/43; 310/91; 310/156; 29/598
[58] Field of Search ................. 310/42, 43, 156, 261, 310/218, 91, 264, 265; 29/598

[56] References Cited
U.S. PATENT DOCUMENTS
2,907,903 10/1959 Reijnst ................................. 310/156
4,594,525 6/1986 Stokes ................................. 310/156
4,625,392 12/1986 Stokes ................................. 310/42

FOREIGN PATENT DOCUMENTS
0634273 1/1962 Canada ................................ 310/156
0066269 5/1980 Japan .................................. 310/156

Primary Examiner—Skudy R.
Attorney, Agent, or Firm—William H. Steinberg; James C. Davis, Jr.; Paul R. Webb, II

[57] ABSTRACT

A rotor assembly includes a flux ring comprising a generally cylindrical ring of magnetic flux conducting material. A plurality of circumferentially spaced reinforcing ribs are fastened to the ring, each of the ribs projecting radially outward of the ring and extending axially for substantially the length thereof. A separate body of magnetic material is fastened to the ring between each adjacent pair of ribs.

9 Claims, 3 Drawing Sheets

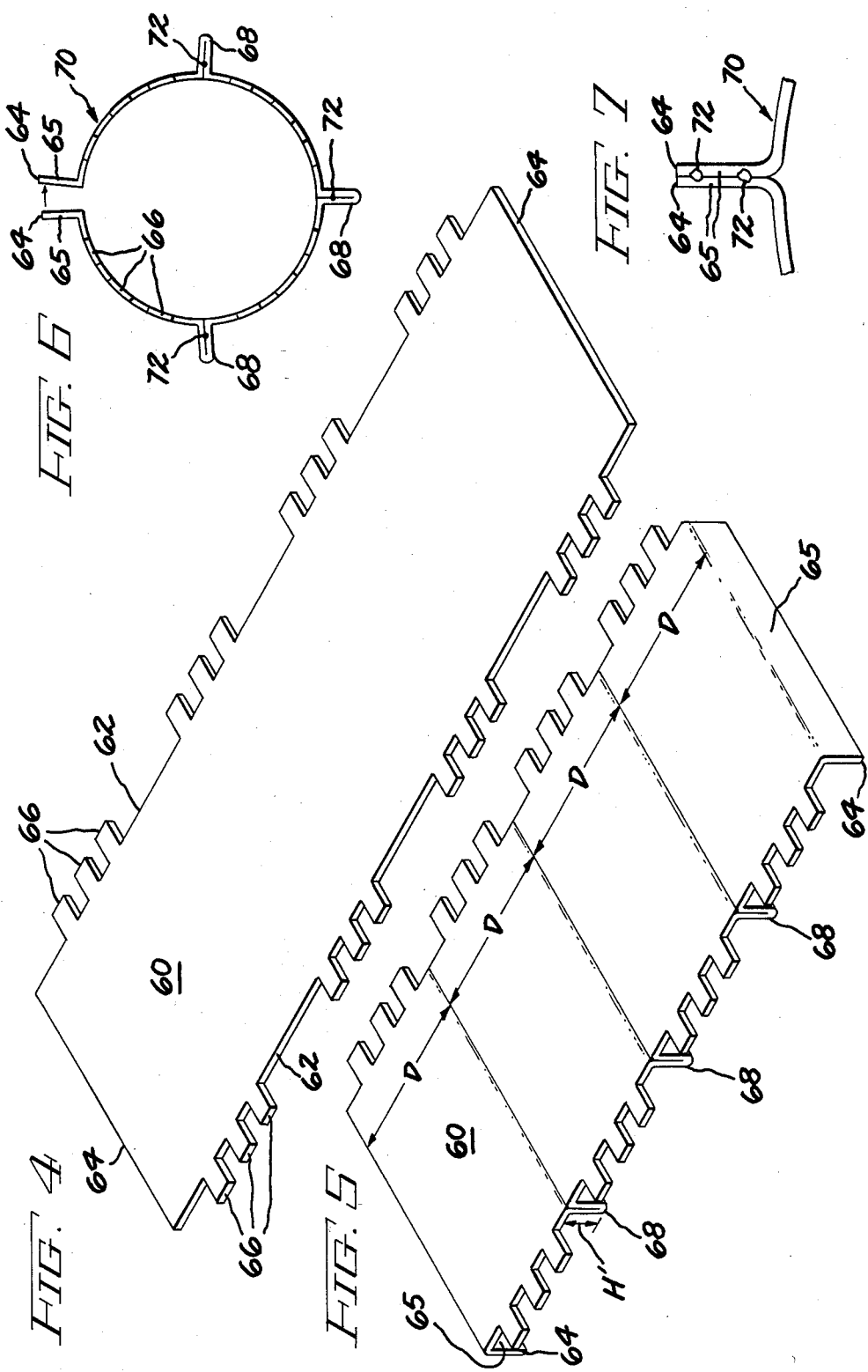

ROTOR ASSEMBLY

This application is a continuation of application Ser. No. 857,280, filed 4-30-86, now abandoned.

This invention relates generally to electric motors and more particularly to a rotor assembly and method of making the same.

BACKGROUND OF THE INVENTION

In many applications employing electric motors it is desirable to periodically change the direction of rotation of a rotor assembly in the motor to oscillate a driven apparatus. Such applications include, for example, washing machines wherein such oscillating electric motors are used to drive an agitator. When such oscillating electric motors are used, they negate the need for complex and expensive transmissions otherwise required to convert a rotating motion into an oscillating motion.

A problem encountered in the use of oscillating electric motors is that of the oscillatory torque establishing a fatigue load in the rotor assembly. This fatigue load is established at an interface between a flux ring and a magnetic body disposed thereon. Inertial effects associated with this fatigue load cause the development of a cyclic shear stress field, i.e. a shear stress field which reverses direction in each cycle of rotor oscillation, in a direction circumferential to the flux ring. This cyclic shear stress field eventually causes loosening and dislodgement of the magnetic bodies from the flux ring.

It would thus be desirable to provide a rotor assembly which is not subject to the ill effects caused by the cyclic shear stress field. It would be further desirable if such a rotor assembly could be economically fabricated using conventional technologies.

OBJECTS OF THE INVENTION

A principal object of the present invention is to provide a new and improved rotor assembly which provides substantial support for magnetic bodies mounted thereon and which is thus particularly adapted for use in an oscillating electric motor.

Another object of the present invention is to provide a new and improved flux ring which is particularly adapted for use in rotor assemblies of oscillating electric motors.

A further object of the present invention is to provide a method of economically manufacturing a flux ring for use in rotor assemblies of oscillating electric motors.

SUMMARY OF THE INVENTION

A new and improved rotor assembly includes a flux ring comprising a generally cylindrical ring of magnetic flux conducting material. A plurality of circumferentially spaced reinforcing ribs are fastened to the ring, each of the ribs projecting radially outward of the ring and extending axially for substantially the length thereof. The rotor assembly employing this flux ring further includes a separate body of magnetic material fastened to the ring between each adjacent pair of ribs. In a preferred embodiment of the invention, the cylindrical ring and ribs are formed from a single piece of material, and the magnetic bodies are shaped to substantially fill the space between adjacent pairs of ribs.

BRIEF DESCRIPTION OF THE FIGURES

While the specification concludes with claims defining the features of the invention that are regarded as novel, it is believed that the invention, together with further objects thereof, will be better understood from a consideration of the following description in conjunction with the drawing figures, in which:

FIGS. 4-7 illustrate subsequent steps in a method of manufacturing a flux ring in accordance with the present invention.

DETAILED DESCRIPTION OF THE INVENTION

Figure 1:
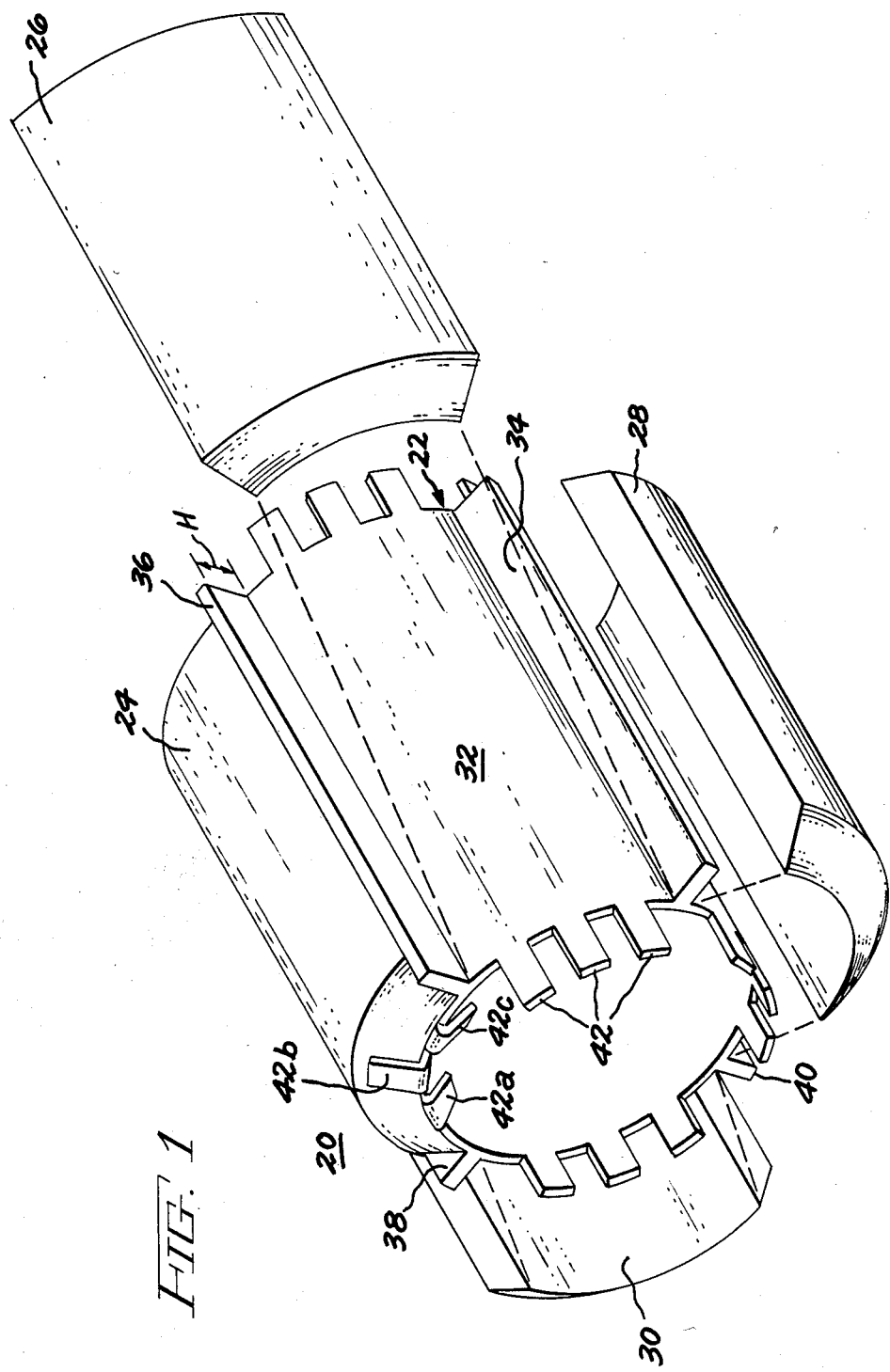
FIG. 1 illustrates a perspective, exploded view of a rotor assembly constructed in accordance with the present invention.

Referring now to FIG. 1, a new and improved rotor assembly 20 is shown comprising a generally cylindrical flux ring 22 and four generally bar-shaped, arcuate, permanently magnetic bodies 24, 26, 28 and 30. In the exploded view of FIG. 1, magnetic body 24 is shown mounted on flux ring 22, for example using an appropriate adhesive, while magnetic bodies 26, 28, and 30 are shown removed therefrom to better illustrate details of the flux ring.

Flux ring 22 includes a generally cylindrical body portion 32 comprising a magnetic flux conducting material such as iron. Integral with ring body portion 32 are four generally straight, parallel reinforcing ribs 34, 36, 38 and 40 spaced circumferentially at regular intervals about the ring body portion and extending radially outward therefrom to a common height H. Further integral with ring body portion 32 are twenty-four bendable tabs 42; six bendable tabs disposed between each pair of adjacent ribs 34-36, 36-38, 38-40 and 40-34, with three of each six tabs adjoining opposite ends of body portion 32. For purposes of explanation, the visible tabs 42 situated between adjacent pair 36-38 are labeled as 42a, 42b, 42c. Tab 42b is shown bent upward to aid in fastening magnetic body 24 to flux ring body portion 32. Tabs 42a and 42c are shown bent downward to engage a matrix shown and described in FIGS. 2 and 3 below. The remaining tabs 42, shown in a straight, unbent position, are subsequently bent in the manner described above to form a rotor assembly according to a method set out hereinbelow. Each magnetic body 24, 26, 28 and 30 comprises a permanent magnet material, such as ferrite ceramic material, and is sized to fit snugly between its corresponding pair of adjacent reinforcing ribs. Magnetic bodies 24, 26, 28, and 30 include alternating North-South poles in a manner known to those skilled in the art.

Figure 2:
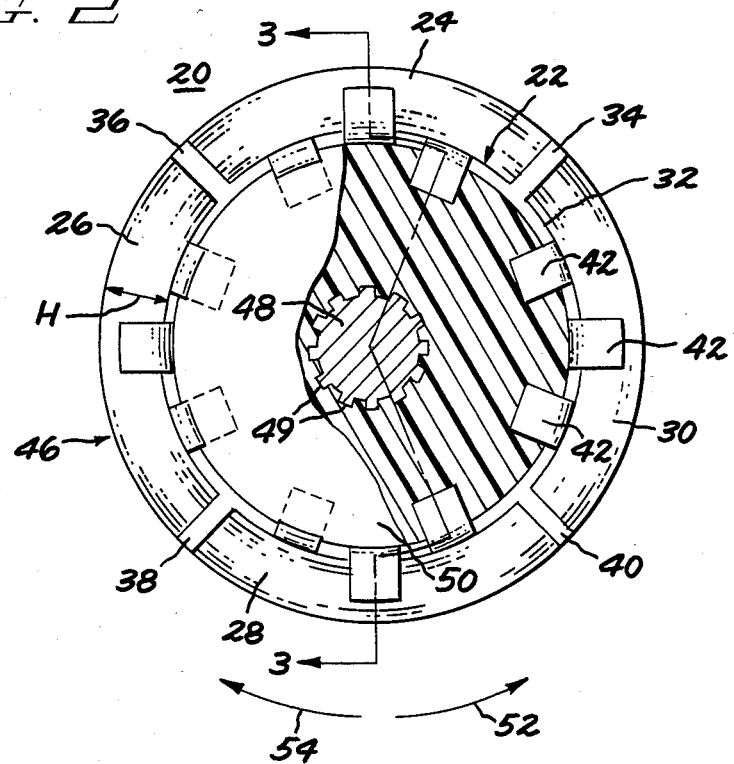
FIG. 2 illustrates an end view of the rotor assembly of FIG. 1 mounted on a shaft.
Figure 3:
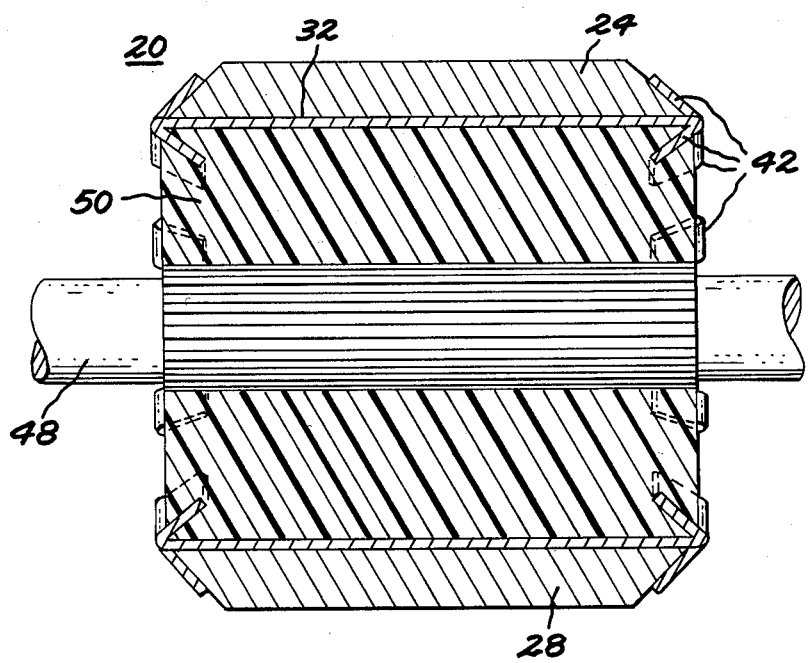
FIG. 3 illustrates a sectional view taken along line 3—3 of FIG. 2.

Referring now to FIGS. 2 and 3, rotor assembly 20 is shown with all magnetic bodies 24, 26, 28 and 30 fastened to flux ring body portion 32 such that the outer surfaces thereof form a generally cylindrical surface 46 of approximately the same height H as reinforcing ribs 34, 36, 38 and 40. Further shown in FIGS. 2 and 3 is a shaft 48 disposed coaxially with flux ring 22 and mechanically connected thereto by a matrix 50 disposed between the inner surface of flux ring 22 and the shaft. Shaft 48 comprises, for example, steel, and optionally includes ribs 49 for making a secure connection with matrix 50. Matrix 50 comprises for example plastic, and optionally extends outward of flux ring 22 to overlap the transverse ends of magnetic bodies 24, 26, 28, 30 and the tabs 42 overlying those ends. Tabs 42 are bent, in the manner described with respect to FIG. 1 above, to engage both plastic matrix 50 and magnetic bodies 24, 26, 28 and 30.

In operation, when rotor assembly 20 is employed in an electric motor (not shown) and rotated about the axis of shaft 48, reinforcing ribs 34, 36, 38 and 40 serve to support magnetic bodies 24, 26, 28, 30, on flux ring 22. Rotor assembly 20 has particular application in oscillating electric motors (not shown) of the type described hereinabove, wherein the direction of rotation of the rotor assembly is periodically reversed (i.e. between directions 52 and 54 as shown in FIG. 2). When rotor assembly 20 is used in such oscillating electric motors, reinforcing ribs 34, 36, 38 and 40 function to counteract a cyclic shear stress field in the circumferential direction which would otherwise loosen and dislodge magnetic bodies 24, 26, 28, 30 from flux ring 22.

It will be understood that while ribs 34, 36, 38 and 40 are shown extending the entire width of flux ring 22, they need only extend a distance sufficient to provide support to magnetic bodies 24, 26, 28 and 30. It will be further understood that, while matrix 50 is shown filling the entirety of the space between flux ring 22 and shaft 48, it need only fill a portion sufficient to establish a connection between the shaft and the flux ring.

Flux ring 22 of FIGS. 1–3, which includes ribs 34, 36, 38 and 40 integral with a ring body portion 32, can be manufactured, for example, by broaching or extruding a relatively thick cylinder of magnetic flux conducting material to form the ribs. Subsequently, integral tabs 42 can be cut or punched from ring body portion 38. These cutting, broaching and extruding processes are conventional processes well known to those skilled in the art.

It will be understood that while body portion 32, reinforcing ribs 34, 36, 38, 40, and bendable tabs 42 are shown in FIGS. 1–3 as being integrally formed from a single piece of magnetic flux conducting material, the invention is not so limited. Ribs 34, 36, 38 and 40 and tabs 42 could, for example, be welded to body portion 32, or affixed thereto by one of many apparatus or methods readily apparent to those skilled in the art. Further, only ring body portion 32 of flux ring 22 need comprise a magnetic flux conducting material.

FIGS. 4–7 illustrate consecutive steps in yet another process of manufacturing a flux ring in accordance with the present invention. This process is performed by first providing a relatively flat sheet 60 of magnetic flux conducting material as shown in FIG. 4. Sheet 60 is generally rectangular, including transverse edges 62 and longitudinal edges 64. Generally opposing groups of three bendable tabs 66 are spaced at regular intervals along transverse ends 62 of sheet 60, these tabs being formed by conventional sheet metal cutting, punching or machining processes.

Portions of sheet 60 situated between opposing groups of tabs 66 are folded, using conventional sheet metal shaping technology, to form three generally parallel reinforcing ribs 68 as shown in FIG. 5. Each reinforcing rib 68 comprises a double thickness of sheet 60, and projects substantially orthogonally from sheet 68 in a common direction and to a common height H'. Each of ribs 68 extends for at least a substantial portion of the transverse width of sheet 60, and preferably for the entire width of the sheet as shown in FIG. 5. Further as shown in FIG. 5, portions of sheet 60 proximate longitudinal ends 64 are bent to form lips 65. Lips 65 are generally parallel to and of equal height H' with ribs 68, the lips and ribs being substantially equidistantly spaced at intervals D along the length of sheet 60.

Subsequent to the forming of ribs 68, sheet 60 is formed into a generally cylindrical ring 70 as shown in FIG. 6. Ring 70 is formed with lips 65 abutting such that these lips and ribs 68 extend radially outwardly of ring 70. This forming or rolling of sheet 60 to form ring 70 is performed by conventional metal working processes well known to those skilled in the art. As is shown in FIGS. 6 and 7, one or more welds or adhesive bonds 72 is preferably formed between abutting lips 64 and in the fold of each rib 68 to strengthen ring 70. A rotor assembly incorporating this flux ring is subsequently formed by securing magnetic bodies to ring 70 and fastening the ring with attached magnetic bodies to a shaft, the shaft and magnetic bodies preferably being of the type described with respect to FIGS. 1–3 above. Magnetic bodies are fastened to the ring, for example, with an appropriate adhesive. Ring 70 and the attached magnetic bodies are fastened to a shaft, for example, by positioning the shaft substantially concentrically with rig 70 and molding a plastic matrix between the ring and the shaft.

It will be understood that ring 70, formed according to the above-described method, is substantially the same in form and function as ring 22 of FIGS. 1–3, the only difference therebetween being the method of forming the ribs and the subsequent folded rib structure of ring 70. It will further be understood that the subsequently formed rotor assembly is similarly identical to rotor assembly 20 of FIGS. 1–3. The method shown in FIGS. 4–7 provides the advantage of being substantially simpler, and thus more economical to perform than the broaching or extruding processes described above.

While preferred embodiments of the invention have been illustrated and described, it will be clear that the invention is not so limited. Numerous modifications, changes, variations, substitutions and equivalents will occur to those skilled in the art without departing from the spirit and scope of the present invention. For example, while in all of the embodiments of the invention shown and described hereinabove the reinforcing ribs are shown as being rectangular in shape, other shapes sufficient to support the magnetic bodies situated therebetween would equally suffice. Further, while bendable tabs have been shown as used for securing the flux ring to both the shaft and the magnetic bodies, such tabs are not required. Any radially inwardly extending protuberances, such as ribs, would suffice for securing the flux ring to the matrix, and such protuberances could be avoided completely if the matrix were be otherwise secured, for example by a pressure or adhesive bond, to the ring. Similarly, the tabs which aid in securing the magnetic bodies to the flux ring could be replaced by similarly functional features, or omitted entirely when an otherwise secure bond such as an adhesive, is provided between the ring and the magnetic bodies. Accordingly, it is intended that the invention herein be limited only by the scope of the appended claims.

What is claimed is:

1. A rotor assembly comprising:
   a generally cylindrical ring;
   a plurality of circumferentially spaced reinforcing ribs integral with said ring, each of said reinforcing ribs projecting radially outward of said ring and extending axially for substantially the length of said ring, each of said ribs being substantially straight and of a common height, and said ribs being generally parallel to each other and spaced at regular intervals about the circumference of said ring;

at least one bendable tab proximate each end of said ring intermediate each adjacent pair of said reinforcing ribs; and said ring, ribs and tabs being formed from a single piece of magnetic flux conducting material.

2. A rotor assembly comprising:

a generally cylindrical ring of magnetic flux conducting material;

a plurality of circumferentially spaced reinforcing ribs integral with said ring, each of said reinforcing ribs projecting radially outward of said ring, said ring and said reinforcing ribs being formed from a single piece of sheet material, each of said reinforcing ribs being substantially straight and of a common height, said reinforcing ribs being generally parallel to each other and spaced at regular intervals about the circumference of said ring; and a plurality of bodies of magnetic material, one of said bodies of magnetic material fastened to said rings between each adjacent pair of said reinforcing ribs, said bodies of magnetic material shaped to substantially fill the space between an adjacent pair of said reinforcing ribs, the radially outer surfaces of said bodies of magnetic material forming a cylindrical surface, approximately even with the uppermost edge of said reinforcing ribs.

3. The rotor assembly of claim 2 wherein each of said reinforcing ribs comprises a fold in said sheet material.

4. The rotor assembly of claim 2 and further including:

a shaft disposed generally coaxially with said ring; and means disposed between the interior of said ring and said shaft for supporting said ring on said shaft.

5. The rotor assembly of claim 4 wherein said supporting means comprises a plastic matrix.

6. The rotor assembly of claim 5 wherein said plastic matrix fills substantially the entire space between the inner surface of said ring and said shaft.

7. The rotor assembly of claim 5 and further including securing means integral with said ring for securing said ring to said shaft.

8. The rotor assembly of claim 7 wherein said securing means comprises at least one bendable tab disposed proximate each end of said shaft intermediate each adjacent pair of said ribs, each of said bendable tabs positioned to engage said matrix.

9. A rotor assembly comprising:

a generally cylindrical ring of magnetic flux conducting material;

a plurality of circumferentially spaced reinforcing ribs projecting radially outward of said ring and extending axially for substantially the length of said ring, each of said reinforcing ribs being substantially straight and of a common height, said reinforcing ribs being generally parallel to each other and spaced at regular intervals about the circumference of said ring;

a body of magnetic material fastened to said ring between each adjacent pair of said reinforcing ribs, each of said bodies of magnetic material being shaped to substantially fill the space between an adjacent pair of said reinforcing ribs, the radially outer surfaces of said bodies of magnetic material forming a cylindrical surface approximately even with the uppermost edges of said reinforcing ribs;

a shaft disposed generally coaxially with said ring;

a matrix disposed between the interior of said ring and said shaft for supporting said ring on said shaft;

at least two bendable tabs proximate each end of said ring intermediate each pair of adjacent reinforcing ribs, one of said tabs positioned to engage said matrix and one said tabs positioned to engage one of said magnetic bodies; and said ring, reinforcing ribs and tabs formed from a single sheet of magnetic flux conducting material.

* * * * *